United States Patent [19]
Kirkby

[11] Patent Number: 5,940,008
[45] Date of Patent: Aug. 17, 1999

[54] COMMUNICATIONS SWITCHING NETWORK

[75] Inventor: Paul Anthony Kirkby, Old Harlow, United Kingdom

[73] Assignee: Northern Telecom Limited, Montreal, Canada

[21] Appl. No.: 08/901,983

[22] Filed: Jul. 29, 1997

[30] Foreign Application Priority Data

Jul. 29, 1996 [GB] United Kingdom .................. 9615854

[51] Int. Cl.[6] .......................... H04Q 11/00; H04M 7/00; H04M 15/00
[52] U.S. Cl. .................................. 340/825.79; 340/825.8; 340/826; 340/827; 370/229; 370/238
[58] Field of Search ............................. 340/828.79, 825.8, 340/826, 827; 370/254, 238, 230.1, 229

[56] References Cited

U.S. PATENT DOCUMENTS

| | | | |
|---|---|---|---|
| 4,532,625 | 7/1985 | Stover | 370/58 |
| 5,050,162 | 9/1991 | Golestani | 370/60 |
| 5,179,552 | 1/1993 | Chao | 370/60 |
| 5,426,674 | 6/1995 | Nemirovsky et al. | 395/200 |
| 5,539,815 | 7/1996 | Samba | 379/200 |
| 5,544,163 | 8/1996 | Madonna | 370/60.1 |

FOREIGN PATENT DOCUMENTS

| | | |
|---|---|---|
| 0 538 853 A2 | 4/1993 | European Pat. Off. |
| 0690640 | 1/1996 | European Pat. Off. |
| WO95/34981 A2 | 12/1995 | WIPO |

*Primary Examiner*—William A. Cuchlinski, Jr.
*Assistant Examiner*—Yonel Beaulieu
*Attorney, Agent, or Firm*—Lloyd L. Zickert

[57] ABSTRACT

A communications network is provided in which switching nodes configure periodically. There is a plurality of shortest paths having equal propagation delays between two switching nodes between which there is at least one intermediate node.

18 Claims, 3 Drawing Sheets

COMMUNICATIONS SWITCHING NETWORK

This invention relates to communications switching networks, including a plurality of switching nodes interconnected by data transmission pipes.

BACKGROUND OF THE INVENTION

The background of the invention will be described in relation to long-distance communications although it will be appreciated that the invention can be applied to a network of any physical size including, for example, for distributing internal data in a data processor or computer.

In networks where a large amount of traffic is telephone calls, it has been customary to configure the network at different times of the day in order to accommodate changes in the volume of traffic. Thus, for example, the network is configured to accommodate the volume of transatlantic traffic which is greatest during that period of the day when business office hours overlap on both sides of the Atlantic.

It is expected that traffic will become less predominantly telephone calls as the volume of data and video increase. It is conjectured that changes in the volume of traffic will become less predictable as users, including autonomous software agents, access international data and video banks, for example, and that a network which can be reconfigured very flexibly and relatively quickly will be needed. One of the problems, for example, in reconfiguring present telephone networks is that it cannot be done while any of the pipes involved are carrying traffic without interrupting all the voice calls being carried or causing errors in the data traffic.

SUMMARY OF THE INVENTION

Against this background, in accordance with the invention, there is provided a communications network in which switching nodes configure periodically, there being a plurality of shortest paths having equal propagation delays between two switching nodes between which there is at least one intermediate node.

Since the propagation delays are equal, the network can be reconfigured even while calls are in progress on the pipes involved without any noticeable effect or detriment to the user except, perhaps, changes in delays due to congestion and changes in charging rates. When a switching node is configured periodically, it can stay in the same configuration or change its configuration.

The switching nodes are preferably arranged in successive sets, there being a plurality of paths between successive sets and all paths between two successive sets having equal data propagation delays from end to end.

In a preferred arrangement, the switching nodes are configurable so that all data arriving at one input port is directed to a selected output port. This enables the use of optical switches for the switching nodes.

Preferably, some of the switching nodes have two input ports and two output ports. This enables the network to be more easily controlled.

In order to allow data to pass to the periphery or outside of a network, at least some of the switching nodes preferably have two input ports and two output ports in the plane of the network and two input ports and two output ports in the plane of another network or a periphery, the switching nodes being configurable so that all data arriving at one input port is directed to one or the other of the output ports selectively in either plane.

These switching nodes preferably comprise a plurality of switching elements, each switching element having two input ports and two output ports, the switching elements being configurable so that all data arriving at one input port is directed to one or the other of the output ports selectively.

Further, these switching nodes may be conveniently implemented by sixteen switching elements.

Each path through the switching node may be bi-directional.

In order to produce a highly symmetrical network, the switching nodes can preferably be configured so that data launched onto the network from one output port of a switching node would arrive back at an input port to that node if all the switching nodes involved are configured similarly.

Other features and advantages of the invention will be apparent from the following detailed disclosure, taken in conjunction with the accompanying sheets of drawings, wherein like reference numerals refer to like parts.

DESCRIPTION OF THE INVENTION

Figure 2:
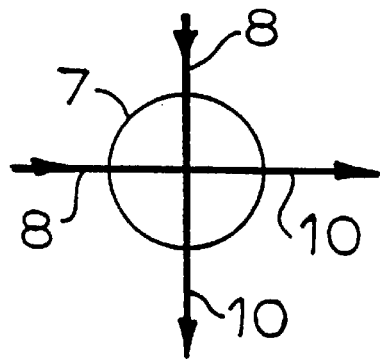
FIG. 2 is a schematic of a switching element for the network of FIG. 1, shown in one configuration.
Figure 3:
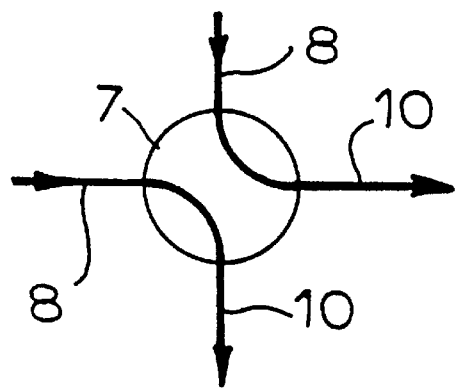
FIG. 3 is a schematic of the switching element of FIG. 2 in an alternative configuration.

Referring to the drawings, the hypernetwork comprises a global plaid or lattice of data transmission pipes 2, some intersections between which merely cross, such as the intersection referenced 4. At other intersections, switching nodes, of which one is referenced 6, are located. Some of these may be simple switching elements 7, having two input ports 8 and two output ports 10, which allow all data on the pipes to proceed straight across the intersection as illustrated in FIG. 2, or which swap or exchange the data as illustrated in FIG. 3. The element may be bi-directional, so that data may be transmitted simultaneously in the reciprocal directions. For convenience, the configuration in FIG. 2 is referred to as a "cross configuration" and that in FIG. 3 is referred to as a "bar configuration". Alternatively, ones of the switching nodes also allow the exchange of data with a hyponetwork or a peripheral, as will be explained.

Figure 1:
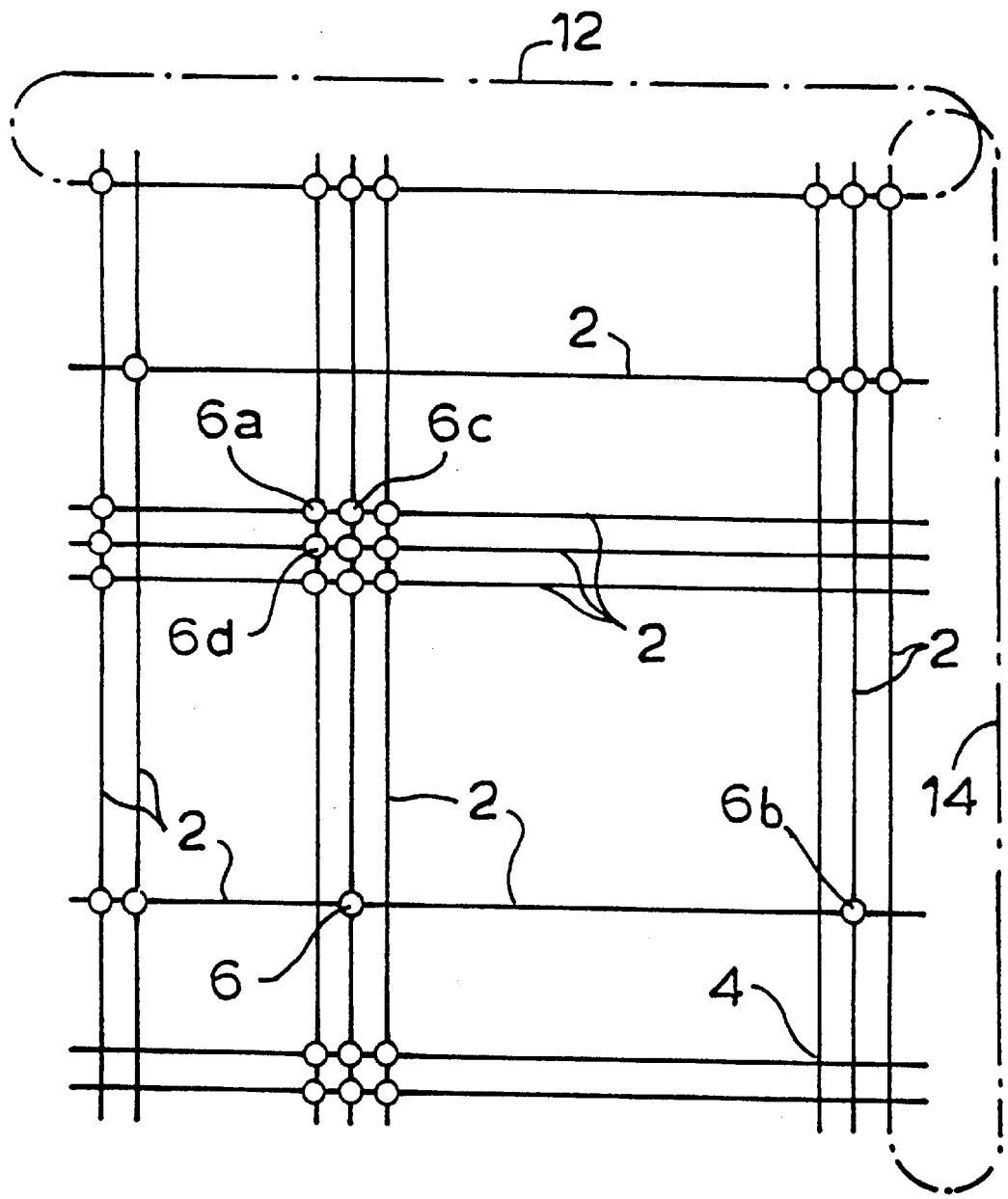
FIG. 1 is a schematic of a hypernetwork embodying the invention.

At the edges of the schematic of FIG. 1, the network is looped round to form a complete circuit, two loops being illustrated at 12 and 14.

A basic property or principle of the network is that the propagation delays in alternative shortest paths between switching nodes, such as between 6a and 6b, which have at least one intermediate node, are equal. In FIG. 1, propagation delays are represented by equal lengths of pipe. That assumes a constant speed of light. That may change, however, dependent on the medium. The actual physical location of the switching nodes is not important. If the length of a physical link needs to be increased, this can be done, for instance, by adding a coil of fiber or an electronic first-infirst-out delay line. Control circuits may be used to precisely adjust delays. What is important is the time it takes data to transit through the pipe. It will be observed that if all the north-south, or vertical, circuits have equal propagation delays, and all the east-west, or horizontal, circuits have equal propagation delays, the pipes correspond to orthogonal lines on the surface of a four-dimensional sphere. A hypersphere may be a higher order network layer such as a global communications network, while a hyposphere may be a local area network (LAN). The transmission paths forming each layer in the network may be visualized as forming a sphere with vertical transmission paths being like lines of latitude on a hemisphere, and horizontal transmission paths being like lines of longitude on a hemisphere. To satisfy this condition all the loops corresponding to 12 must be equal as must all the loops corresponding to 14 be equal.

Since the propagation delays are equal for a plurality of shortest paths from switching node 6a to switching node 6b, the timing of data will remain constant on arrival at node 6b, irrespective of which of the shortest paths it took. If it is desirable to reconfigure the network, this may be done even though pipes involved in the reconfiguration may be carrying traffic, without any noticeable effect to the user except, perhaps, changes in delays due to congestion and changes in charging rates.

In a preferred example, the pipes 2 are implemented in optical fibre and the switching nodes 6 are optical switches. The data is sent in frames each containing a super-packet which may have a longer duration than the propagation delay between some successive switching nodes. The frames also each contain a switching interval, separating one packet from the next. The switching interval is sufficiently long to allow the switching nodes to configure between packets, that is to say, a node may change or not change its existing configuration. The switching intervals may be determined at any particular node by detecting a predetermined pattern in the data to signify the end of a packet, or by frame timing recovery or by a combination of both. One example of a predetermined pattern is no light transmitted for a predetermined period in an optical fiber implementation. The frames are all of the same length, so the switching nodes configure periodically. In this example, the intention is to allow the network to be configured flexibly. The slow operation of some types of optical switches relative to electronic switches is sufficient for the purpose, since the whole input on one pipe to a port of the switching node is passed straight on or swapped. For example, the switching nodes may be configured every one millisecond. Dependent on the amount of traffic on a particular path, it may set up on a long-term basis, or periodically once in a number of switching intervals.

The invention is not limited to the use of super-packets. In an extreme alternative example, a frame contains only one bit. In this example the switching nodes are implemented by electronic circuits, for example, in a computer or data processor.

The general arrangement shown in FIG. 1 allows data to proceed south and east or, if the paths are bi-directional, north and west. Thus, for example, transmission is not simultaneously possible in the directions south and west, or north and east. This has the effect that the nodes 6d and 6c, although physically close, can only be connected by a path which involves nearly a complete circuit.

In order to make provision for transmission in the precluded directions, in the analogy of the four dimensional sphere, the pipes must define squares on the surface of the sphere. Thus, taking any switching node, e.g., 6a, for every node, e.g., 6c on the west-east pipe, there must be another node 6d on the north-south pipe from which the propagation delay from the node 6a is the same. In an example, the nodes are arranged in successive sets and there are a plurality of paths between successive sets and all paths between successive sets have equal propagation delays. The effect is to create successive sets of nodes which configure simultaneously within the set. Whichever direction data is traveling in, south and east or south and west, the propagation delays are such that the interpacket switching interval occurs at the same time. In one example of such a network all the data pipes could have the same propagation delay. The network would then be synchronous in the sense that all nodes would switch simultaneously.

However, even if each switching node is able to provide a configuration which sent data packets arriving on the north port to either the west or to the east port, conflict has to be avoided. This could be achieved by operating the entire network periodically in a south and east configuration for some frames and in a south and west configuration for other frames, in each case the selectable alternative configuration being the cross configuration.

In order to allow hyponetworks or peripherals to communicate over the network, interplane switching nodes are provided. These have four ports in the plane of the hypernetwork and four ports in the plane of the hyponetwork or peripheral. The ports may be arranged as two input ports and two output ports in each plane, or may be bi-directional. The interplane switching nodes may be both arranged in a cross or bar configuration within the respective planes or may be configured to swap or exchange data from a port in one plane to a selected port in the other plane.

Figure 4:
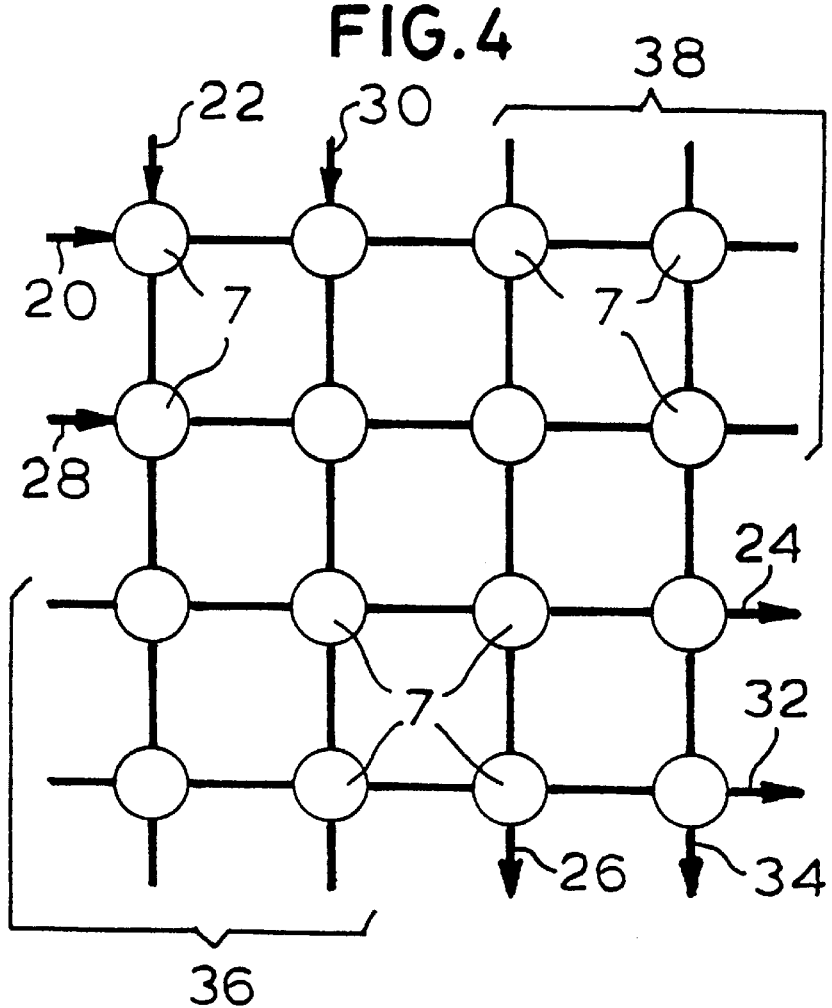
FIG. 4 is a schematic of a switching node which enables comprehensive communication between the network and another network or a peripheral.

An implementation of such a switching node, using the simple switching elements of FIGS. 2 and 3, is shown in FIG. 4. The arrangement of sixteen switching elements in an array as shown is extremely comprehensive. One direction of data transmission is illustrated. Input ports 20 and 22 are located in the hypernetwork. Output ports in the hypernetwork are ports 32 and 34 in one arrangement. In this arrangement, input ports in the hyponetwork or periphery are provided at 28 and 30. Output ports 24 and 26 being provided in the hyponetwork. In an alternative arrangement the hypernetworks output ports would be those indicated at 32 and 34, while those in the hyponetwork or periphery would be those indicated at 24 and 26. Many different arrangements are possible, different patterns of elemental switching patterns being required to achieve the various nodal configurations.

There may be a hierarchy of hypernetworks and hyponetworks, and these may be constructed to achieve super symmetry in which many symmetries are discernible no matter where the view point is located. It may be further appreciated that super symmetry relates to the fact that any layer in the communications network has an architecture which is identical to that of any other layer in the network. The sixteen element internetwork switching nodes of FIG. 4, interfacing hypernetworks and hyponetworks in which all data pipes have equal propagation delays, would provide a high degree of symmetry.

Figure 5:
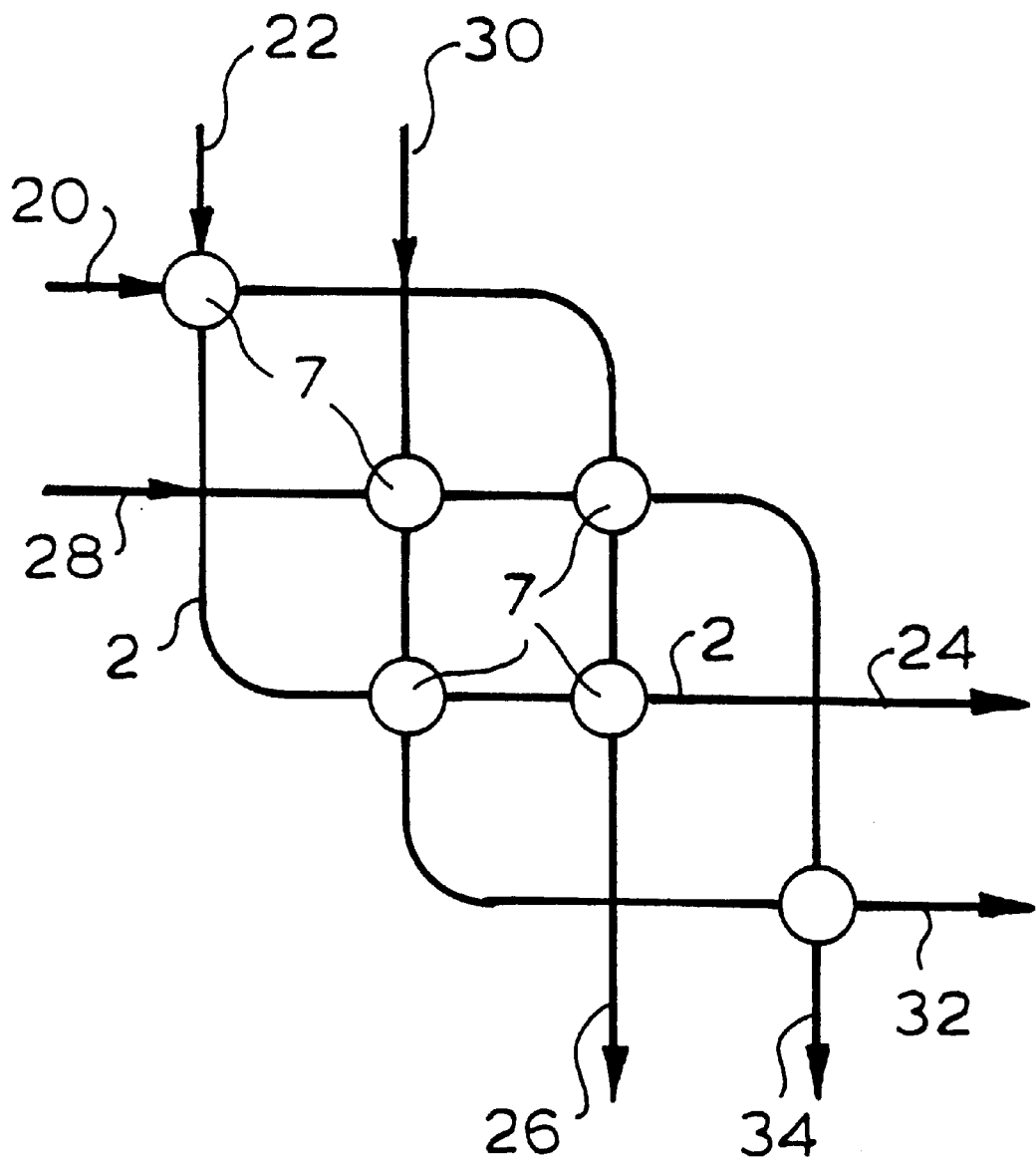
FIG. 5 is a schematic of a switching node which enables basic communication between the network and another network or a peripheral.

It will be appreciated that some of the ports 36 and 38 of the array are not connected to anything. These could be used to provide a simultaneous return path over different pipes or connection to alternative hyperspheres. If that is not required, the node may be reduced to the arrangement of six elements illustrated in FIG. 5.

It will be understood that modifications and variations may be effected without departing from the scope of the novel concepts of the present invention, but it is understood that this application is to be limited only by the scope of the appended claims.

The invention is hereby claimed as follows:

1. A communications network having a plurality of switching nodes that configure periodically to provide alternate routing paths for avoiding congestion, there being a plurality of shortest paths having equal propagation delays between two switching nodes between which there is at least one intermediate node, wherein the switching nodes are configurable so that data launched onto the network from one output port of a switching node would arrive back at an input port to that node.

2. A network as claimed in claim 1, wherein the switching nodes are arranged in successive sets, there being a plurality of paths between successive sets and all paths between two successive sets having equal data propagation delays from end to end.

3. A network as claimed in claim 1, in which the switching nodes are configurable so that all data arriving at one input port is directed to a selected output port.

4. A network as claimed in claim 1, wherein some of the switching nodes have two input ports and two output ports.

5. A network as claimed in claim 1, wherein some of the switching nodes have two input ports and two output ports in the plane of the network and two input ports and two output ports in the plane of another or a periphery, the switching nodes being configurable so that all data arriving at one input port is directed to one or the other output port selectively in either plane.

6. A network as claimed in claim 5, wherein said switching nodes comprise a plurality of switching elements, each switching element having two input ports and two output ports, the switching elements being configurable so that all data arriving at one input port is directed to one or the other of the output ports selectively.

7. A network as claimed in claim 6, wherein some of the switching nodes comprise sixteen switching elements.

8. A network as claimed in claim 1, wherein each path through at least one of the switching nodes is bi-directional.

9. A communications network having a plurality of switching nodes that configure periodically to provide alternate routing paths for avoiding congestion, there being a plurality of shortest paths having equal propagation delays between two switching nodes between which there is at least one intermediate node, wherein the switching nodes are preferably configurable so that data launched onto the network from one output port of a switching node would arrive back at an input port to that node.

10. A communications network having a plurality of switching nodes that configure periodically to provide alternate routing paths for avoiding congestion, there being a plurality of shortest paths having equal propagation delays between two switching nodes between which there is at least one intermediate node, wherein there is a hierarchy of intermeshed hyper and hypo spheres connected in a super symmetric manner.

11. A communications switching network comprising: a plurality of interconnected switching nodes for configuring periodically to provide alternate routing paths for avoiding congestion, and a plurality of shortest paths between two switching nodes having at least one intermediate node therebetween, each said path having equal propagation delays, wherein the switching nodes are configurable so that data launched onto the network from one output port of a switching node would arrive back at an input port to that node.

12. The communications network of claim 11, wherein the switching nodes include one input port and one output port and are configurable so that all data going to one inlet port is directed to a selected output port.

13. The communications network of claim 11, wherein one of the switching nodes includes two input ports and two output ports thereby enabling the network to be more easily controlled.

14. The communications network of claim 11, wherein the switching nodes are arranged in successive sets, there being a plurality of paths between successive sets and all paths between two successive sets having equal data propagation delays from end to end.

15. The communications network of claim 11, in which the switching nodes are configurable so that all data arriving at one input port is directed to a selected output port.

16. The communications network of claim 11, wherein each path through at least one of the switching nodes is bi-directional.

17. A communications switching network comprising: a plurality of interconnected switching nodes for configuring periodically to provide alternate routing paths for avoiding congestion, and a plurality of shortest paths between two switching nodes having at least one intermediate node therebetween, each said path having equal propagation delays, wherein the switching nodes are preferably configurable so that data launched onto the network from one output port of a switching node would arrive back at an input port to that node.

18. A communications switching network comprising: a plurality of interconnected switching nodes for configuring periodically to provide alternate routing paths for avoiding congestion, and a plurality of shortest paths between two switching nodes having at least one intermediate node therebetween, each said path having equal propagation delays, wherein there is a hierarchy of intermeshed hyper and hypo spheres connected in a super symmetric manner.

* * * * *